United States Patent
He et al.

(10) Patent No.: US 12,228,601 B2
(45) Date of Patent: Feb. 18, 2025

(54) SINGLE-ENDED FAULT POSITIONING METHOD AND SYSTEM FOR HIGH-VOLTAGE DIRECT-CURRENT TRANSMISSION LINE OF HYBRID NETWORK

(71) Applicant: WUHAN UNIVERSITY, Hubei (CN)

(72) Inventors: Yigang He, Hubei (CN); Lei Wang, Hubei (CN); Lie Li, Hubei (CN); Yingying Zhao, Hubei (CN); Bolun Du, Hubei (CN); Liulu He, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 804 days.

(21) Appl. No.: 17/496,774

(22) Filed: Oct. 8, 2021

(65) Prior Publication Data
US 2022/0196720 A1    Jun. 23, 2022

(30) Foreign Application Priority Data
Dec. 18, 2020    (CN) .......................... 202011501736.9

(51) Int. Cl.
*G01R 31/08*    (2020.01)
*G06F 30/27*    (2020.01)
(Continued)

(52) U.S. Cl.
CPC ......... *G01R 31/085* (2013.01); *G01R 31/088* (2013.01); *G06F 30/27* (2020.01); *G06N 3/045* (2023.01); *G06F 2113/04* (2020.01)

(58) Field of Classification Search
CPC ..... G01R 31/085; G01R 31/088; G06F 30/27; G06N 3/045
See application file for complete search history.

(56) References Cited

FOREIGN PATENT DOCUMENTS

| CN | 111308271 A | * | 6/2020 | ............. G01R 31/08 |
| CN | 111382790 A | * | 7/2020 | ............... G06K 9/62 |
| CN | 111948493 A | * | 11/2020 | ............. G01R 31/08 |

OTHER PUBLICATIONS

Wang J, Zheng X, Tai N. DC fault detection and classification approach of MMC-HVDC based on convolutional neural network. In2018 2nd IEEE Conference on Energy Internet and Energy System Integration (EI2) Oct. 20, 2018 (pp. 1-6). IEEE. (Year: 2018).*

(Continued)

*Primary Examiner* — Chuen-Meei Gan
(74) *Attorney, Agent, or Firm* — JCIPRNET

(57) ABSTRACT

The disclosure discloses a single-ended fault positioning method and system for a HVDC power transmission line based on a hybrid deep network. The method comprises the following: collecting rectification side bus output voltage and current signals of a HVDC power transmission system under different fault types, fault distances and transition resistances as an original data set; eliminating electromagnetic coupling of the bipolar direct-current line by using phase-mode transformation, extracting IMF components of fault voltage and current signals under different fault scenes by using variational mode decomposition, and calculating TEO of the IMF components to obtain a fault data set after feature engineering; normalizing the fault data set, and dividing the fault data set into a training set and a test set; and successively inputting the training set and the test set into a hybrid network of a convolutional neural network and a long short-term memory network for training and testing.

16 Claims, 4 Drawing Sheets

(51) Int. Cl.
 *G06N 3/045* (2023.01)
 *G06F 113/04* (2020.01)

(56) References Cited

OTHER PUBLICATIONS

Wang Q, Yu Y, Ahmed HO, Darwish M, Nandi AK. Fault detection and classification in MMC-HVDC systems using learning methods. Sensors. Aug. 8, 2020;20(16):4438. (Year: 2020).*

* cited by examiner

SINGLE-ENDED FAULT POSITIONING METHOD AND SYSTEM FOR HIGH-VOLTAGE DIRECT-CURRENT TRANSMISSION LINE OF HYBRID NETWORK

CROSS-REFERENCE TO RELATED APPLICATION

This application claims the priority benefit of China application serial no. 202011501736.9, filed on Dec. 18, 2020. The entirety of the above-mentioned patent application is hereby incorporated by reference herein and made a part of this specification.

BACKGROUND

Field of the Disclosure

The disclosure relates to the field of fault position of high-voltage direct-current transmission systems, and more specifically, relates to a single-ended fault positioning method and system for a high-voltage direct-current transmission line based on a hybrid deep network.

Description of Related Art

In recent years, renewable power generation has been widely adopted. The High-Voltage Direct-Current Transmission (HVDC) system is characterized in the advantage of long-distance and high-power electrical energy transmission. This technology can transmit large amounts of wind energy over long distances from the ocean to the land. Due to the long-distance transmission and complex environmental factors in nature, the possibility of occurrence of fault in the transmission line of HVDC is high. Therefore, realizing timely and accurate fault position is the key to reliable operation of the power system. The application of traveling wave method is more often adopted in fault position of transmission line of HVDC. Compared with the double-ended traveling wave method, the single-ended traveling wave method does not require a global positioning system and a communication equipment, thereby avoiding errors caused by unsynchronized measurement time. When the conventional single-ended traveling wave method is adopted for fault position in HVDC systems, the method has many disadvantages, such as high dependence in sampling frequency, and difficulty in determining wave speed and identifying wave heads when high impedance faults occur. The traveling wave speed of the single-ended traveling wave method has frequency-varying characteristics, and when the fault occurs in different fault segments, it is difficult to distinguish the source of the reflected wave head detected on the rectifier side.

SUMMARY OF THE DISCLOSURE

In view of the defects and the needs for improvement of the current technologies, the disclosure provides a single-ended fault positioning method and system for a high-voltage direct-current transmission line based on a hybrid deep network, which improves the fault positioning accuracy of transmission line of HVDC, and is less affected by fault types, noise, sampling frequency and different HVDC topologies.

In order to achieve the above purpose, according to one aspect of the disclosure, a single-ended fault positioning method for transmission line of HVDC based on a hybrid deep network is provided, which includes:

(1) Establishing a simulation model of the HVDC bipolar transmission system based on a voltage source converter, and selecting the output voltage and current signals of the rectifier side bus under different fault types, fault distances and transition resistances as the original data set, and labeling classification of the fault segments and labeling location of the fault position according to the fault segments of the transmission line and its precise fault position where the fault occurs;

(2) Performing variational modal decomposition (VMD) on the voltage and current on the rectifier side in various fault scenarios after phase-mode transformation, obtaining the effective intrinsic mode function IMF component of the signal, and calculating the Teager energy operator (TEO) of the IMF component to obtain the fault data set that is subjected to feature engineering;

(3) Performing normalized data preprocessing on the fault data set after VMD and TEO feature engineering, and dividing the preprocessed fault data set into a training set and a test set;

(4) Inputting the training set and test set to the CNN-LSTM network model in sequence for model training and test respectively, wherein the convolutional neural network (CNN) is used as a classifier to identify fault segments, and long short-term memory (LSTM) network is used as a regressor to position faults.

In some optional embodiments, step (1) includes:

In the simulation model of the HVDC bipolar transmission system based on the voltage source converter, different fault scenarios are set to construct the original data set. Specifically, the transmission line on the DC side is set with one type of fault scenarios every several kilometers from the rectifier side bus. The fault types include positive grounding, negative grounding, and positive and negative short-circuit grounding. The grounding resistances are set at equal intervals from the minimum value to the maximum value within the preset range. Every combination of various fault distances, fault types and grounding resistances is one type of fault scenarios, and the output voltage and current signals of the rectifier side bus under all fault scenarios are measured as the original data set.

In some optional embodiments, step (2) includes:

Noise is added to the voltage and current signals respectively on the bipolar bus on the rectifier side under various fault scenarios to simulate the noise interference scenarios of the measuring equipment. The noise-containing voltage signal undergoes phase-to-mode conversion to obtain the line-mode voltage component, and the noise-containing current signal undergoes phase-to-mode conversion to obtain the line-mode current component. Each of the line-mode voltage components and each of the line-mode current components are subjected to VMD decomposition to obtain the first IMF component IMF1 (IMF1 component) of high frequency, and the TEO of IMF1 component of each high frequency is calculated to obtain the fault data set after feature engineering.

In some optional embodiments, step (3) includes:

The IMF1 component of the voltage after TEO is subjected to max-min normalization to obtain the preprocessed voltage component, and the calculated IMF1 component of the current after TEO is subjected to max-min normalization to obtain the preprocessed current component. The preprocessed voltage component and current component are constructed into a 2-dimensional tensor (2D-Tensor), and all 2D-Tensors are divided into a training set and a test set.

In some optional embodiments, step (4) includes:

The training set is input into the hybrid deep model for training. The 2D-CNN in the hybrid deep model is used as a classifier to complete the task of identifying fault segments, and LSTM is used as a regressor to integrate the fault segment information in the classifier. Specifically, the division of fault segments needs to be determined according to the accuracy of fault position for model training. A plurality of fault samples corresponding to the fault distance are selected for model training, a tolerance range of a % is set for the fault distance label, and the accuracy of the selected samples for fault position is calculated. The optimal number of fault segments is determined through comparative experiments.

According to another aspect of the disclosure, there is provided a single-ended fault positioning system for transmission line of HVDC based on a hybrid deep network, including:

A data acquisition module configured to establish a simulation model of the HVDC bipolar transmission system based on a voltage source converter, and select the output voltage and current signals of the rectifier side bus under different fault types, fault distances and transition resistances as the original data set, and label classification of the fault segments and label location of the fault position according to the fault segments of the transmission line and its precise fault position where the fault occurs;

A feature engineering module configured to perform VMD on the voltage and current on the rectifier side in various fault scenarios after phase-mode transformation, obtain the effective intrinsic mode function IMF component of the signal, and calculate the TEO of the IMF component to obtain the fault data set that is subjected to feature engineering;

A preprocessing module configured to perform normalized data preprocessing on the fault data set after VMD and TEO feature engineering, and divide the preprocessed fault data set into a training set and a test set;

A training module configured to input the training set and test set to the CNN-LSTM network model in sequence for model training and test respectively, wherein the CNN is used as a classifier to identify fault segments, and LSTM network is used as a regressor to position faults.

In some optional implementations, the data acquisition module is configured to set different fault scenarios to construct the original data set in the simulation model of the HVDC bipolar transmission system based on the voltage source converter. Specifically, the transmission line on the DC side is set with one type of fault scenarios every several kilometers from the rectifier side bus. The fault types include positive grounding, negative grounding, and positive and negative short-circuit grounding. The grounding resistances are set at equal intervals from the minimum value to the maximum value within the preset range. Every combination of various fault distances, fault types and grounding resistances is one type of fault scenarios, and the output voltage and current signals of the rectifier side bus under all fault scenarios are measured as the original data set.

In some optional implementations, the feature engineering module is configured to add noise to the voltage and current signals respectively on the bipolar bus on the rectifier side under various fault scenarios to simulate the noise interference scenarios of the measuring equipment. The noise-containing voltage signal undergoes phase-to-mode conversion to obtain the line-mode voltage component, and the noise-containing current signal undergoes phase-to-mode conversion to obtain the line-mode current component. Each of the line-mode voltage components and each of the line-mode current components are subjected to VMD decomposition to obtain the first IMF component IMF1 of high frequency, and the TEO of IMF1 component of each high frequency is calculated to obtain the fault data set after feature engineering.

In some optional implementations, the preprocessing module is configured to perform the max-min normalization on the IMF1 component of the voltage after TEO to obtain the preprocessed voltage component, and perform the max-min normalization on the calculated IMF1 component of the current after TEO to obtain the preprocessed current component. The preprocessed voltage component and current component are constructed into a 2D-Tensor, and all 2D-Tensors are divided into a training set and a test set.

In some optional implementations, the training module is configured to input the training set into the hybrid deep model for training. The 2D-CNN in the hybrid deep model is used as a classifier to complete the task of identifying fault segments, and LSTM is used as a regressor to integrate the fault segment information in the classifier. Specifically, the division of fault segments needs to be determined according to the accuracy of fault position for model training. A plurality of fault samples corresponding to the fault distance are selected for model training, a tolerance range of $\pm a$ % is set for the fault distance label, and the accuracy of the selected samples for fault position is calculated. The optimal number of fault segments is determined through comparative experiments.

According to another aspect of the disclosure, there is provided a computer-readable storage medium on which a computer program is stored. When the computer program is executed by a processor, the steps of the method described in any one of the above embodiments are implemented.

Generally speaking, compared with the conventional technology, the above technical solutions conceived by the disclosure can achieve the following advantageous effects:

For the conventional single-ended traveling wave method, the traveling wave speed has frequency-varying characteristics and it is difficult to determine the wave speed. Moreover, it is difficult to identify the source of the reflected traveling wave on the rectifier side when a fault occurs in different segments of the HVDC transmission line. The disclosure combines the feature extraction algorithm and uses CNN to identify the fault segments, and adopts the CNN-LSTM hybrid network to integrate the fault segment identification information to achieve accurate fault position, and solves the technical problems found in the single-ended traveling wave method. The technical problems of the single-ended traveling wave method includes: high dependence in sampling frequency, and difficulty in determining wave speed and identifying wave heads when high impedance faults occur. Furthermore, the disclosure is less affected by fault types, noise, sampling frequency and different HVDC topologies.

DESCRIPTION OF EMBODIMENTS

In order to make the purposes, technical solutions, and advantages of the disclosure clearer, the following further describes the disclosure in detail with reference to the accompanying drawings and embodiments. It should be understood that the specific embodiments described here are only used to explain the disclosure, but not to limit the disclosure. In addition, the technical features involved in the various embodiments of the disclosure described below can be combined with each other as long as they do not conflict with each other.

Figure 1:
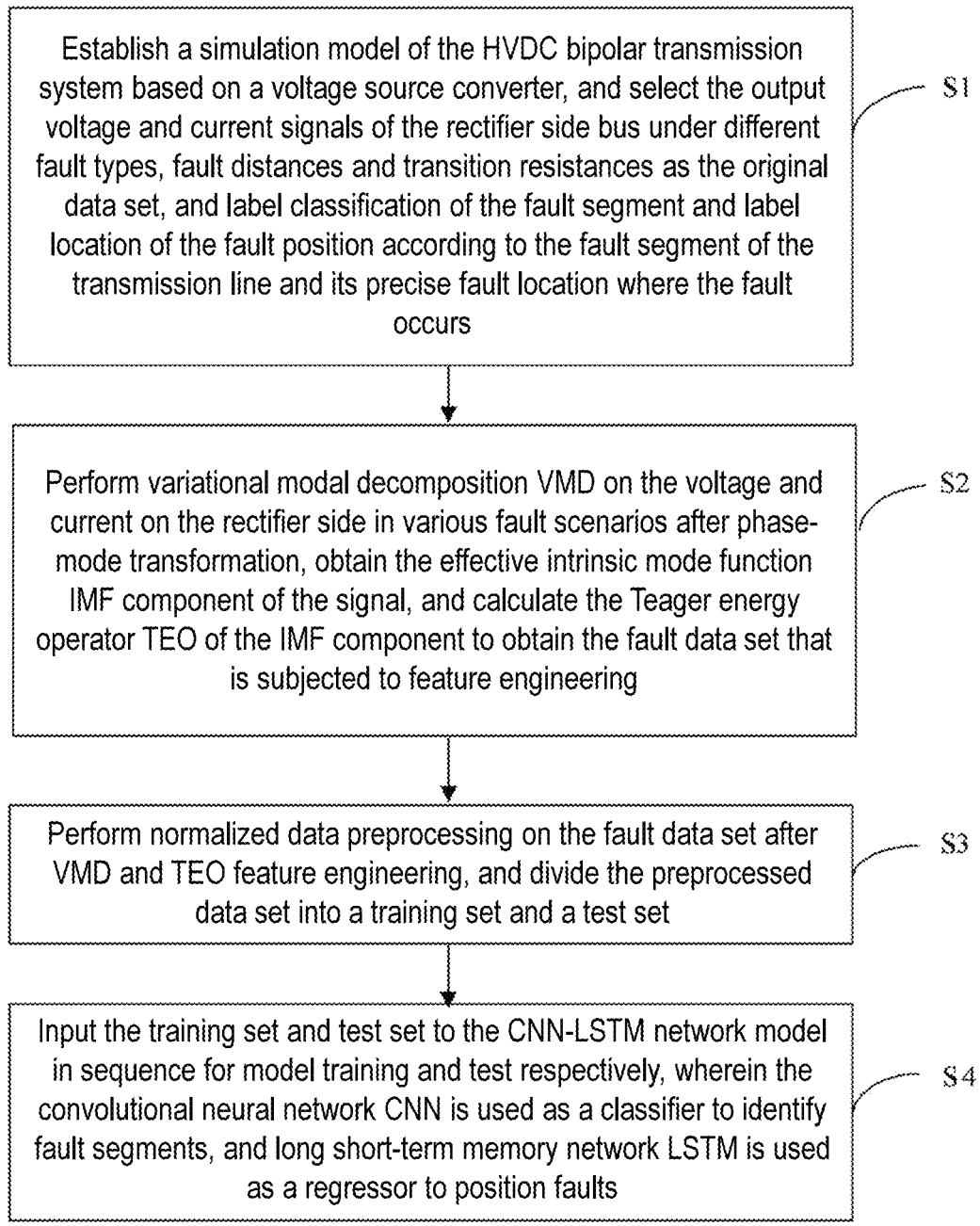
FIG. 1 is a schematic flowchart of a method provided by an embodiment of the disclosure.
Figure 2:
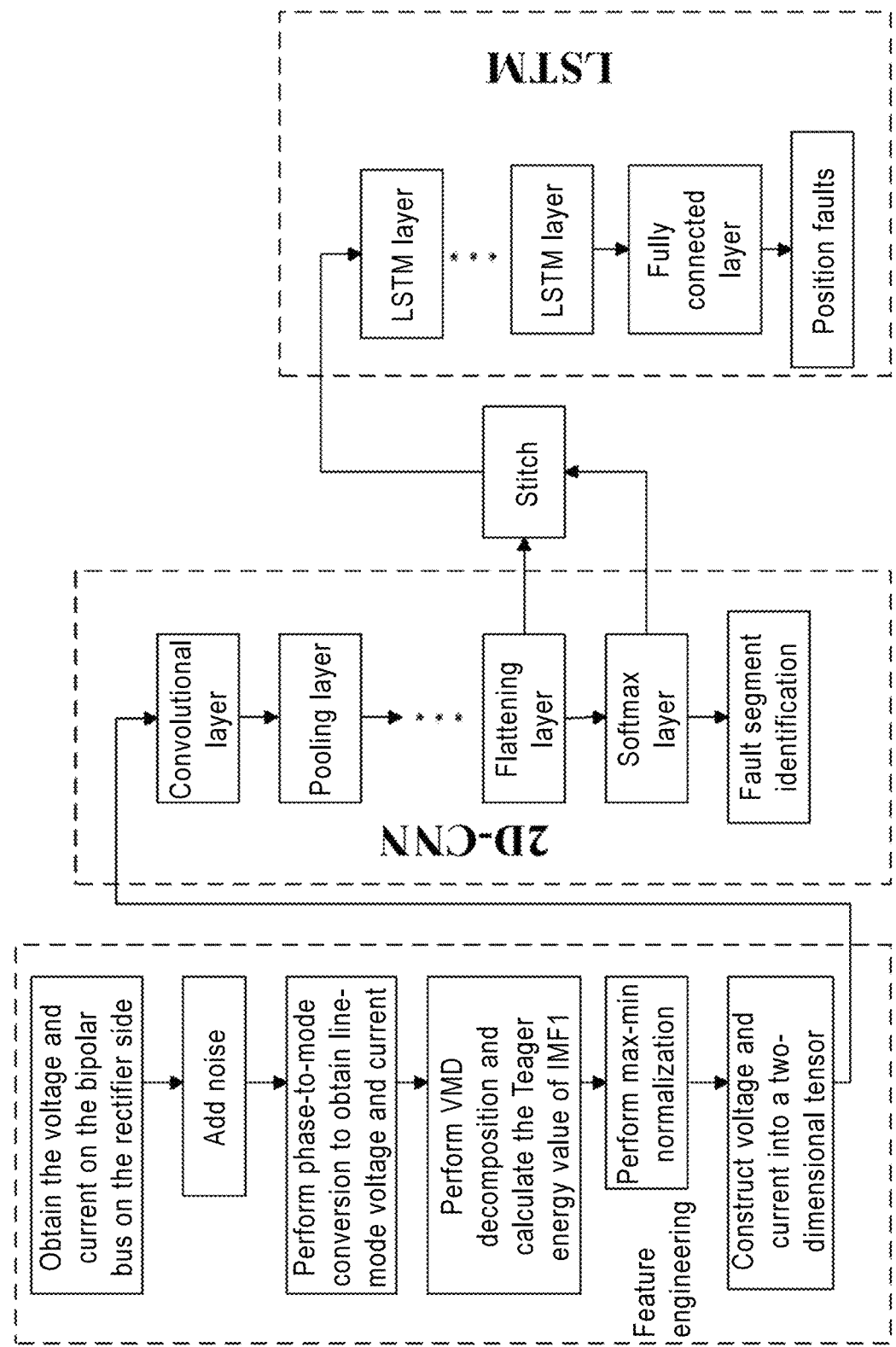
FIG. 2 is a schematic flowchart of another method provided by an embodiment of the disclosure.

FIG. 1 and FIG. 2 show a single-ended fault positioning method for HVDC transmission line based on a hybrid deep network provided by an embodiment of the disclosure, which includes the following steps:

Step S1: Establishing a simulation model of the HVDC bipolar transmission system based on a voltage source converter, and selecting the output voltage and current signals of the rectifier side bus under different fault types, fault distances and transition resistances as the original data set, and labeling classification of the fault segments and labeling location of the fault position according to the fault segments of the transmission line and its precise fault position where the fault occurs;

Specifically, the "label" in the label classification of the fault segments refers to dividing the transmission line into several cell segments and numbering each segment. When the fault occurs in a specific segment, a corresponding identification, that is, the label of the fault segments, is given. The "label" in the label location of the fault position refers to the identification of the precise position of the fault, that is, the fault distance label.

Figure 3:
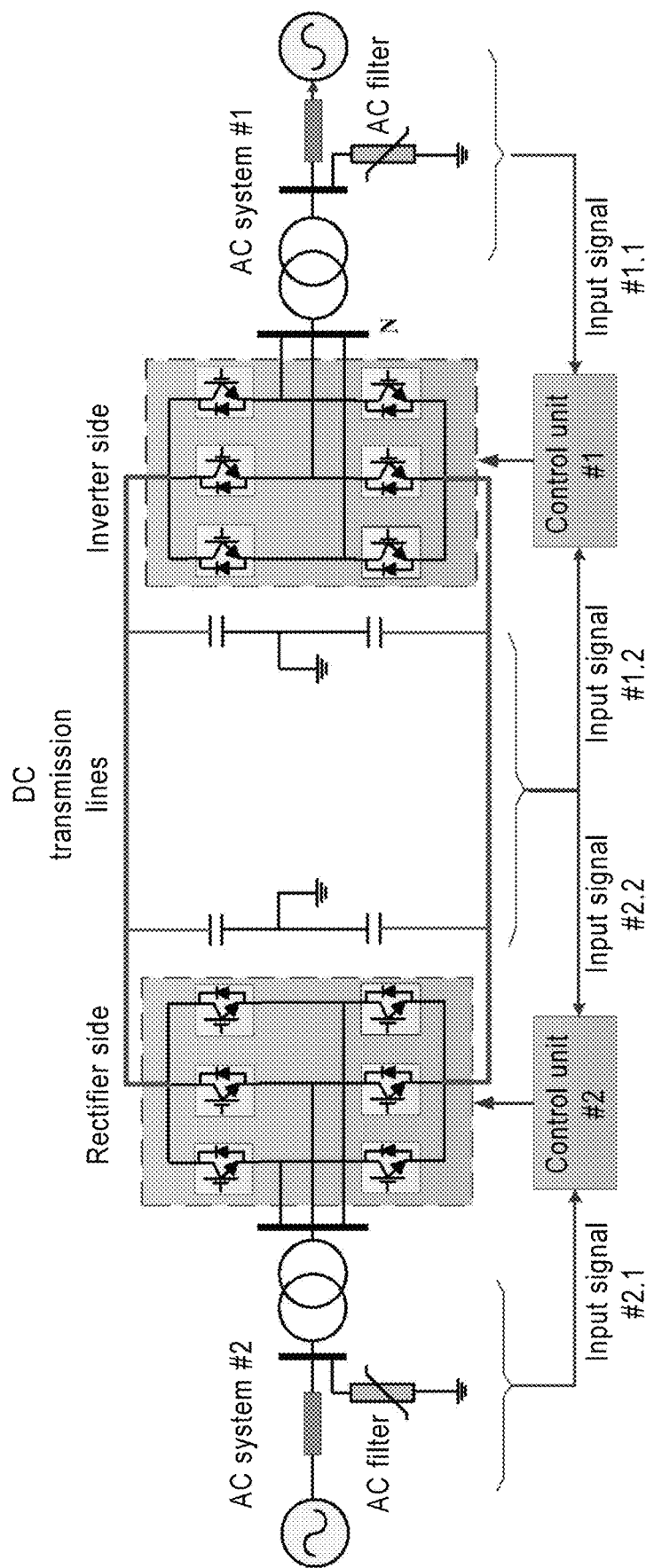
FIG. 3 is a system simulation topology diagram showing the basic structure of one type of VSC-HVDC provided by an embodiment of the disclosure.

In step S1, a simulation model of the bipolar transmission system based on VSC-HVDC (Voltage Source Converter based High Voltage Direct Current Transmission) is established, and its simulation topology is shown in FIG. 3. Different fault scenarios are set to construct the original data set. The transmission line on the DC side is set every one kilometer from the rectifier side bus. The fault types of include positive grounding, negative grounding, and positive and negative short-circuit grounding. The grounding resistances are set at equal intervals from the minimum value to the maximum value within the preset range. Every combination of various fault distances, fault types and grounding resistances is one type of fault scenarios, and the output voltage and current signals of the rectifier side bus under all fault scenarios are measured as the original data set.

Figure 4:
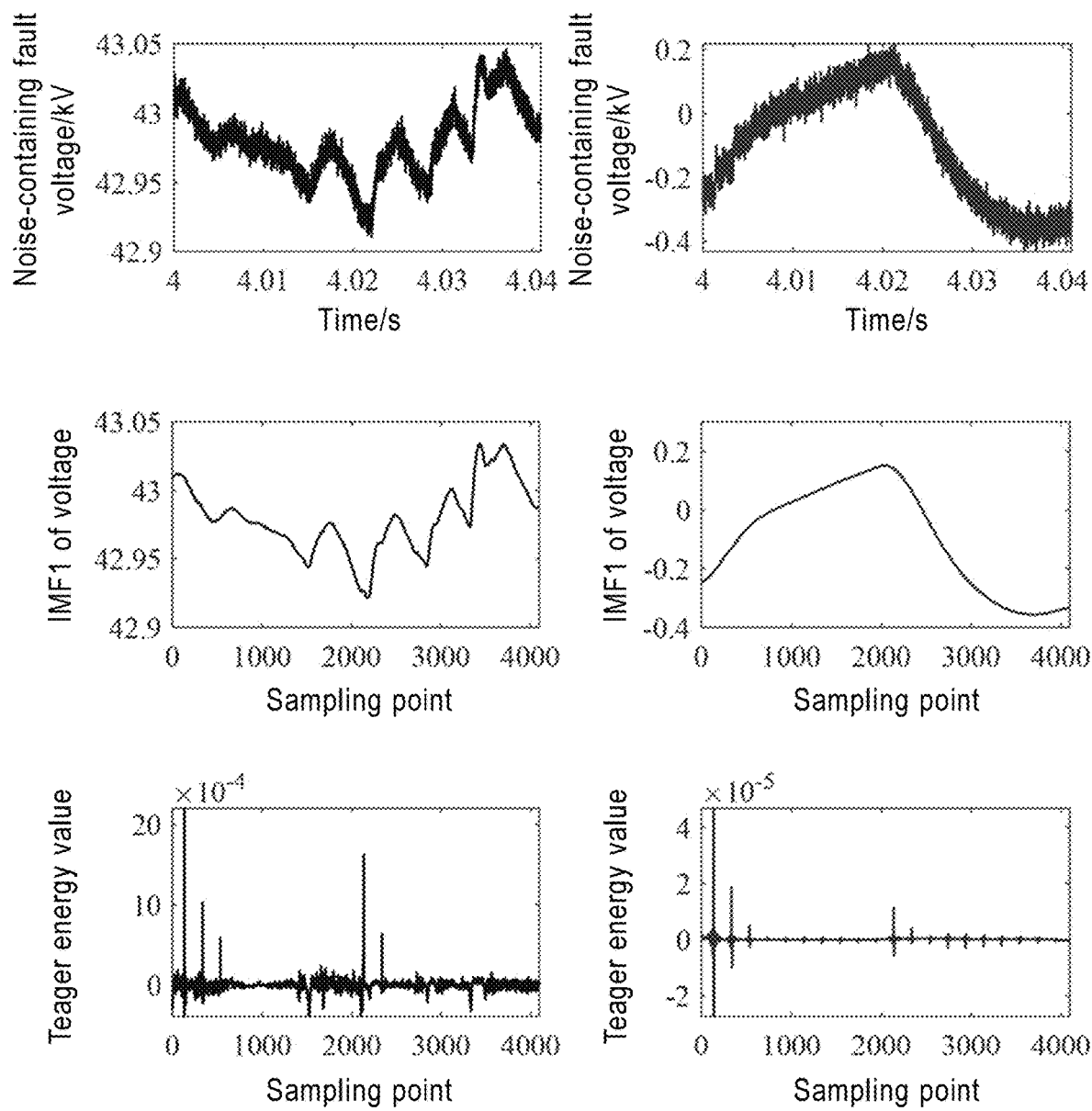
FIG. 4 shows an experimental result after VMD and TEO feature engineering performed to a voltage and a current according to an embodiment of the disclosure.

Step S2: Performing VMD on the voltage and current on the rectifier side in various fault scenarios after phase-mode transformation, obtaining the effective intrinsic mode function IMF component of the signal, and calculating the TEO of the IMF component to obtain the fault data set that is subjected to feature engineering;

In step S2, noise is added to the voltage and current signals respectively on the bipolar bus on the rectifier side under various fault scenarios to simulate the noise interference scenarios of the measuring equipment. The noise-containing voltage signal undergoes phase-to-mode conversion to obtain the line-mode voltage component, and the noise-containing current signal undergoes phase-to-mode conversion to obtain the line-mode current component. Each of the line-mode voltage components and each of the line-mode current components corresponding to the voltage and current on the rectifier side under various fault scenarios after phase-to-mode conversion are subjected to VMD decomposition to obtain the effective IMF component of the signal, and calculate the TEO of the IMF component of high frequency to obtain the fault data set that is subjected to feature engineering. When a negative ground fault occurs in the VSC-HVDC transmission system, the experimental results obtained from performing VMD and TEO feature engineering to the voltage and current are shown in FIG. 4.

Step S3: Performing normalized data preprocessing on the fault data set after VMD and TEO feature engineering, and dividing the preprocessed fault data set into a training set and a test set;

In step S3, normalized data preprocessing is performed on the fault data set after VMD and TEO feature engineering, and the preprocessed voltage component and current component are constructed into a 2D-Tensor. Specifically, a set of voltage components and their corresponding set of current components are combined into a 2-dimensional tensor, and these 2D-Tensors are divided into a training set and a test set.

Step S4: The training set and test set are input to the CNN-LSTM network model in sequence for training and test respectively as shown in FIG. 2, wherein the CNN is used as a classifier to identify fault segments, and LSTM network is used as a regressor to position fault. The hybrid CNN-LSTM network can complete the two tasks, namely fault segment identification and precise position of fault points. CNN realizes fault segments classification by processing 2-dimensional tensors to identify fault segments; LSTM performs regression analysis on the high-dimensional time sequence with rich feature information output from CNN. The fault segment information can be integrated when fault positioning is performed, so as to realize accurate and intelligent single-ended fault positioning.

The specific fault segments division needs to be determined according to the accuracy of the fault position trained by the CNN-LSTM model. A number of fault samples in the training set corresponding to the fault distance are selected for model training. A tolerance range of ±a % (such as ±5%) is set for the fault distance label, and the accuracy rate of fault position of these samples is calculated. The optimal number of fault segments is determined by comparing the accuracy rate of fault positioning under different model parameters. When the hybrid CNN-LSTM network is used for fault positioning, the fault segment information can be integrated to realize intelligent single-ended fault positioning.

The single-ended fault positioning method for HVDC transmission line based on the hybrid deep network in the embodiment of the disclosure uses VMD and TEO feature engineering to improve the effect of model training. In the conventional single-ended traveling wave method, the traveling wave speed has frequency-varying characteristics and it is difficult to determine the wave speed. It is difficult to distinguish the source of the reflected wave head on the rectifier side when a fault occurs in different segments of the HVDC transmission line. The 2D-CNN in the CNN-LSTM hybrid network is used as a classifier to complete the task of identifying fault segments, and LSTM is used as a regressor to integrate the fault segment information in the classifier to complete the task of precise fault positioning. This method has high fault positioning accuracy and is less affected by fault type, noise, sampling frequency and different HVDC topologies.

This disclosure further provides a single-ended fault positioning system for HVDC transmission lines based on a hybrid deep network, including:

A data acquisition module configured to establish a simulation model of the HVDC bipolar transmission system based on a voltage source converter, and select the output voltage and current signals of the rectifier side bus under different fault types, fault distances and transition resistances as the original data set, and label classification of the fault segments and label location of the fault position according to the fault segments of the transmission line and its precise fault position where the fault occurs;

A feature engineering module configured to perform VMD on the voltage and current on the rectifier side in various fault scenarios after phase-mode transformation, obtain the effective intrinsic mode function IMF component of the signal, and calculate the TEO of the IMF component to obtain the fault data set that is subjected to feature engineering;

A preprocessing module configured to perform normalized data preprocessing on the fault data set after VMD and TEO feature engineering, and divide the preprocessed fault data set into a training set and a test set;

A training module configured to input the training set and test set to the CNN-LSTM network model in sequence for model training and test respectively, wherein the CNN is used as a classifier to identify fault segments, and LSTM network is used as a regressor to position faults.

In some optional implementations, the data acquisition module is configured to set different fault scenarios to construct the original data set in the simulation model of the HVDC bipolar transmission system based on the voltage source converter. Specifically, the transmission line on the DC side is set with one type of fault scenario every several kilometers from the rectifier side bus. The fault types include positive grounding, negative grounding, and positive and negative short-circuit grounding. The grounding resistances are set at equal intervals from the minimum value to the maximum value within the preset range. Every combination of various fault distances, fault types and grounding resistances is one type of fault scenarios, and the output voltage and current signals of the rectifier side bus under all fault scenarios are measured as the original data set.

In some optional implementations, the feature engineering module is configured to add noise to the voltage and current signals respectively on the bipolar bus on the rectifier side under various fault scenarios to simulate the noise interference scenarios of the measuring equipment. The noise-containing voltage signal undergoes phase-to-mode conversion to obtain the line-mode voltage component, and the noise-containing current signal undergoes phase-to-mode conversion to obtain the line-mode current component. Each of the line-mode voltage components and each of the line-mode current components are subjected to VMD decomposition to obtain the first IMF component IMF1 of high frequency, and the TEO of IMF1 component of each high frequency is calculated to obtain the fault data set after feature engineering.

In some optional implementations, the preprocessing module is configured to perform the max-min normalization on the IMF1 component of the voltage after TEO to obtain the preprocessed voltage component, and perform the max-min normalization on the calculated IMF1 component of the current after TEO to obtain the preprocessed current component. The preprocessed voltage component and current component are constructed into a 2D-Tensor, and all 2D-Tensors are divided into a training set and a test set.

In some optional implementations, the training module is configured to input the training set into the hybrid deep model for training. The 2D-CNN in the hybrid deep model is used as a classifier to complete the task of identifying fault segments, and LSTM is used as a regressor to integrate the fault segment information in the classifier. Specifically, the division of fault segments needs to be determined according to the accuracy rate of fault position for model training. A plurality of fault samples corresponding to the fault distance are selected for model training, a tolerance range of ±a % is set for the fault distance label, and the accuracy rate of the selected samples for fault position is calculated. The optimal number of fault segments is determined through comparative experiments.

The disclosure further provides a computer-readable storage medium on which a computer program is stored. When the computer program is executed by a processor, the single-ended fault positioning method for a high-voltage direct-current transmission line based on a hybrid deep network described in the method embodiment is implemented.

It needs to be pointed out that according to the needs of implementation, each step/component described in this disclosure can be split into more steps/components, or two or more steps/components or partial operations of steps/components can be combined into new ones to achieve the purpose of the disclosure.

Those skilled in the art can easily understand that the above descriptions are only the preferred embodiments of the present disclosure and are not intended to limit the present disclosure. Any modification, equivalent replacement and improvement, etc. made within the spirit and principle of the disclosure should all be included in the protection scope of the disclosure.

What is claimed is:

1. A single-ended fault positioning method for a reliable operation of high-voltage direct-current (HVDC) transmission line based on a hybrid deep network, comprising:
    (1) establishing a simulation model of a HVDC bipolar transmission system based on a voltage source converter, and selecting an output voltage and current signals of a rectifier side bus under different fault types, fault distances and transition resistances as an original data set, and labeling classification of fault segments and labeling a location of a fault position according to the fault segments of a transmission line and its precise fault position where the fault occurs;
    (2) performing variational modal decomposition (VMD) on the selected voltage and current on the rectifier side in various fault scenarios after phase-mode transformation, obtaining an effective intrinsic mode function (IMF) component of the signal, and calculating a Teager energy operator (TEO) of the IMF component to obtain a fault data set;
    (3) performing normalized data preprocessing on the fault data set after performing VMD and TEO, and dividing the preprocessed fault data set into a training set and a test set;
    (4) inputting the training set and the test set to a convolutional neural network (CNN)-long short-term memory (LSTM) network model in sequence for model training and test respectively, wherein the CNN is used as a classifier to identify the fault segments, and the LSTM network is used as a regressor to position faults of the HVDC transmission line with minimum effects cause by fault types, noise, sampling frequency and different HVDC topologies.

2. The method according to claim 1, wherein step (1) comprises:
in the simulation model of the HVDC bipolar transmission system based on the voltage source converter, the different fault scenarios are set to construct the original data set, wherein a transmission line on a direct-current (DC) side is set with one type of the fault scenarios every several kilometers from the rectifier side bus, the fault types comprise positive grounding, negative grounding, and positive and negative short-circuit grounding; grounding resistances are set at equal intervals from a minimum value to a maximum value within a preset range, every combination of the various fault distances, the fault types and the grounding resistances is one type of the fault scenarios, and the output voltage and the current signals of the rectifier side bus under all of the fault scenarios are measured as the original data set.

3. The method according to claim 1, wherein step (2) comprises:
noise is added to the voltage and the current signals respectively on the bipolar bus on the rectifier side under various fault scenarios to simulate noise interference scenarios of a measuring equipment, a noise-containing voltage signal undergoes phase-to-mode conversion to obtain a line-mode voltage component, and a noise-containing current signal undergoes phase-to-mode conversion to obtain a line-mode current component, each of the line-mode voltage components and each of the line-mode current components are subjected to VMD decomposition to obtain a first IMF component of high frequency, and the TEO of the first IMF component of each high frequency is calculated to obtain the fault data set after feature engineering.

4. The method according to claim 3, wherein step (3) comprises:
the first IMF component of the voltage after the TEO is subjected to max-min normalization to obtain a preprocessed voltage component, and the calculated first IMF component of the current after the TEO is subjected to max-min normalization to obtain a preprocessed current component, the preprocessed voltage component and the preprocessed current component are constructed into a 2-dimensional tensor (2D-Tensor), and all of the 2D-Tensors are divided into the training set and the test set.

5. The method according to claim 4, wherein step (4) comprises:
the training set is input into a hybrid deep model for training, the 2D-CNN in the hybrid deep model is used as a classifier to complete a task of identifying the fault segments, and the LSTM is used as a regressor to integrate a fault segment information in the classifier, wherein, division of the fault segments needs to be determined according to an accuracy rate of fault position for model training, a plurality of fault samples corresponding to the fault distance are selected for model training, a tolerance range of ±a % is set for a fault distance label, and the accuracy rate of the selected samples for fault position is calculated, an optimal number of the fault segments is determined through comparative experiments,
wherein a % comprises 5%.

6. The method according to claim 2, wherein step (2) comprises:
noise is added to the voltage and the current signals respectively on the bipolar bus on the rectifier side under various fault scenarios to simulate noise interference scenarios of a measuring equipment, a noise-containing voltage signal undergoes phase-to-mode conversion to obtain a line-mode voltage component, and a noise-containing current signal undergoes phase-to-mode conversion to obtain a line-mode current component, each of the line-mode voltage components and each of the line-mode current components are subjected to VMD decomposition to obtain a first IMF component of high frequency, and the TEO of the first IMF component of each high frequency is calculated to obtain the fault data set after feature engineering.

7. The method according to claim 6, wherein step (3) comprises:
the first IMF component of the voltage after the TEO is subjected to max-min normalization to obtain a preprocessed voltage component, and the calculated first IMF component of the current after the TEO is subjected to max-min normalization to obtain a preprocessed current component, the preprocessed voltage component and the preprocessed current component are constructed into a 2-dimensional tensor (2D-Tensor), and all of the 2D-Tensors are divided into the training set and the test set.

8. The method according to claim 7, wherein step (4) comprises:
the training set is input into a hybrid deep model for training, the 2D-CNN in the hybrid deep model is used as a classifier to complete a task of identifying the fault segments, and the LSTM is used as a regressor to integrate a fault segment information in the classifier, wherein, division of the fault segments needs to be determined according to an accuracy rate of fault position for model training, a plurality of fault samples corresponding to the fault distance are selected for model training, a tolerance range of ±a % is set for a fault distance label, and the accuracy rate of the selected samples for fault position is calculated, an optimal number of the fault segments is determined through comparative experiments,
wherein a % comprises 5%.

9. A non-transitory computer-readable storage medium storing a computer program, when the computer program is executed by a processor, causing the processor to execute a single-ended fault positioning method for a reliable operation of high-voltage direct-current (HVDC) transmission lines based on a hybrid deep network, the method comprising:
establishing a simulation model of a HVDC bipolar transmission system based on a voltage source converter, and selecting an output voltage and current signals of a rectifier side bus under different fault types, fault distances and transition resistances as an original data set, and labeling classification of fault segments and labeling a location of a fault position according to the fault segments of a transmission line and its precise fault position where the fault occurs;
performing variational modal decomposition (VMD) on the selected voltage and current on the rectifier side in various fault scenarios after phase-mode transformation, obtaining an effective intrinsic mode function (IMF) component of the signal, and calculating a Teager energy operator (TEO) of the IMF component to obtain a fault data set;

performing normalized data preprocessing on the fault data set after performing VMD and TEO, and dividing the preprocessed fault data set into a training set and a test set;

inputting the training set and the test set to a convolutional neural network (CNN)-long short-term memory (LSTM) network model in sequence for model training and test respectively, wherein the CNN is used as a classifier to identify the fault segments, and the LSTM network is used as a regressor to position faults of the HVDC transmission line with minimum effects cause by fault types, noise, sampling frequency and different HVDC topologies.

10. The non-transitory computer-readable storage medium according to claim 9, wherein the method further comprises:

setting, in the simulation model of the HVDC bipolar transmission system based on the voltage source converter, the different fault scenarios to construct the original data set, wherein a transmission line on a direct-current (DC) side is set with one type of the fault scenarios every several kilometers from the rectifier side bus, the fault types comprise positive grounding, negative grounding, and positive and negative short-circuit grounding; grounding resistances are set at equal intervals from a minimum value to a maximum value within a preset range, every combination of the various fault distances, the fault types and the grounding resistances is one type of the fault scenarios, and the output voltage and the current signals of the rectifier side bus under all of the fault scenarios are measured as the original data set.

11. The non-transitory computer-readable storage medium according to claim 9, wherein the method further comprises:

adding noise to the voltage and the current signals respectively on the bipolar bus on the rectifier side under various fault scenarios to simulate noise interference scenarios of a measuring equipment, wherein a noise-containing voltage signal undergoes phase-to-mode conversion to obtain a line-mode voltage component, and a noise-containing current signal undergoes phase-to-mode conversion to obtain a line-mode current component, each of the line-mode voltage components and each of the line-mode current components are subjected to VMD decomposition to obtain a first IMF component of high frequency, and the TEO of the first IMF component of each high frequency is calculated to obtain the fault data set after feature engineering.

12. The non-transitory computer-readable storage medium according to claim 11, wherein the method further comprises:

performing max-min normalization to the first IMF component of the voltage after the TEO to obtain a preprocessed voltage component, and performing max-min normalization to the calculated first IMF component of the current after the TEO to obtain a preprocessed current component, wherein the preprocessed voltage component and the preprocessed current component are constructed into a 2-dimensional tensor (2D-Tensor), and all of the 2D-Tensors are divided into the training set and the test set.

13. The non-transitory computer-readable storage medium according to claim 12, wherein the method further comprises:

inputting the training set into a hybrid deep model for training, the 2D-CNN in the hybrid deep model is used as a classifier to complete a task of identifying the fault segments, and the LSTM is used as a regressor to integrate a fault segment information in the classifier, wherein, division of the fault segments needs to be determined according to an accuracy rate of fault position for model training, a plurality of fault samples corresponding to the fault distance are selected for model training, a tolerance range of ±a % is set for a fault distance label, and the accuracy rate of the selected samples for fault position is calculated, an optimal number of the fault segments is determined through comparative experiments, wherein a % comprises 5%.

14. The non-transitory computer-readable storage medium according to claim 10, wherein the method further comprises:

adding noise to the voltage and the current signals respectively on the bipolar bus on the rectifier side under various fault scenarios to simulate noise interference scenarios of a measuring equipment, wherein a noise-containing voltage signal undergoes phase-to-mode conversion to obtain a line-mode voltage component, and a noise-containing current signal undergoes phase-to-mode conversion to obtain a line-mode current component, each of the line-mode voltage components and each of the line-mode current components are subjected to VMD decomposition to obtain a first IMF component of high frequency, and the TEO of the first IMF component of each high frequency is calculated to obtain the fault data set after feature engineering.

15. The non-transitory computer-readable storage medium according to claim 14, wherein the method further comprises:

performing max-min normalization to the first IMF component of the voltage after the TEO to obtain a preprocessed voltage component, and performing max-min normalization to the calculated first IMF component of the current after the TEO to obtain a preprocessed current component, wherein the preprocessed voltage component and the preprocessed current component are constructed into a 2-dimensional tensor (2D-Tensor), and all of the 2D-Tensors are divided into the training set and the test set.

16. The non-transitory computer-readable storage medium according to claim 15, wherein the method further comprises:

inputting the training set into a hybrid deep model for training, the 2D-CNN in the hybrid deep model is used as a classifier to complete a task of identifying the fault segments, and the LSTM is used as a regressor to integrate a fault segment information in the classifier, wherein, division of the fault segments needs to be determined according to an accuracy rate of fault position for model training, a plurality of fault samples corresponding to the fault distance are selected for model training, a tolerance range of ±a % is set for a fault distance label, and the accuracy rate of the selected samples for fault position is calculated, an optimal number of the fault segments is determined through comparative experiments, wherein a % comprises 5%.

\* \* \* \* \*